United States Patent
Park et al.

(10) Patent No.: US 8,929,267 B2
(45) Date of Patent: *Jan. 6, 2015

(54) METHOD AND DEVICE FOR OPERATING IN IDLE MODE USING IDENTIFIER TYPE

(75) Inventors: Gi Won Park, Anyang-si (KR); Young Soo Yuk, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 85 days.

This patent is subject to a terminal disclaimer.

(21) Appl. No.: 13/592,966

(22) Filed: Aug. 23, 2012

(65) Prior Publication Data

US 2013/0051296 A1 Feb. 28, 2013

Related U.S. Application Data (60) Provisional application No. 61/527,124, filed on Aug. 25, 2011, provisional application No. 61/536,520, filed on Sep. 19, 2011, provisional application No. 61/536,523, filed on Sep. 19, 2011.

(51) Int. Cl.
*H04W 72/04* (2009.01)
*H04W 52/02* (2009.01)
*H04W 4/00* (2009.01)
*H04W 68/00* (2009.01)

(52) U.S. Cl.
CPC .............. *H04W 4/005* (2013.01); *H04W 68/00* (2013.01)
USPC .......................................... 370/311; 370/459

(58) Field of Classification Search
None
See application file for complete search history.

(56) References Cited

U.S. PATENT DOCUMENTS

| | | | |
|---|---|---|---|
| 2011/0223942 A1* | 9/2011 | Xu et al. ......................... | 455/458 |
| 2012/0063305 A1* | 3/2012 | Chiu et al. ..................... | 370/230 |
| 2012/0178485 A1* | 7/2012 | Zeira et al. ..................... | 455/515 |
| 2012/0195258 A1* | 8/2012 | Zhou et al. ..................... | 370/328 |

OTHER PUBLICATIONS

LG electronics, New M2M specific Assignment A-MAP IE for network reentry of fixed M2M device, Sep. 21, 2011.*
Li H. et al: "Idle mode optimizations for fixed M2M devices", IEEE 802.16 Broadband Wireless Access Working Group IEEE, Jul. 20, 2011, XP002690764.
IEEE P802.16p AWD: "Enhancements to Support Machine-toMachine Applications", IEEE 802.16p-10/0018r2 IEEE, May 25, 2011, pp. 1-27, XP002690765.
Yi-Ting Lin et al.: "Addressing for M2M Devices and Corresponding Masking Schemes of A-A-AMAP IEs", IEEE C80216p IEEE, Mar. 14, 2011, pp. 1-9, XP002690788.

* cited by examiner

*Primary Examiner* — Hassan Kizou
*Assistant Examiner* — Tejis Daya
(74) *Attorney, Agent, or Firm* — McKenna Long & Aldridge LLP

(57) ABSTRACT

A method and device for operating in an idle mode for Machine To Machine (M2M) communication are provided. A M2M device receives a paging message indicating a resource allocation for a ranging request. The M2M device monitors assignment information including the resource allocation for the ranging request. Cyclic redundancy check (CRC) bits of the assignment information are masked with a part of a M2M identifier. The assignment information includes an identifier type indicating that the M2M identifier is a fixed M2M deregistration identifier (FMDID) or a deregistration identifier (DID).

13 Claims, 7 Drawing Sheets

METHOD AND DEVICE FOR OPERATING IN IDLE MODE USING IDENTIFIER TYPE

CROSS-REFERENCE TO RELATED APPLICATIONS

This application claims the benefit of priority of U.S. Provisional applications 61/527,124 filed on Aug. 25, 2011, 61/536,520 filed on Sep. 19, 2011, and 61/536,523 filed on Sep. 19, 2011, all of which are incorporated by reference in their entirety herein.

BACKGROUND OF THE INVENTION

1. Field of the Invention

The present invention relates to wireless communications, and more particularly, to method and device for operating in an idle mode for Machine To Machine (M2M) communication.

2. Related Art

Machine To Machine (M2M) communication is one type of data communication including one or more entities not requiring human interactions. M2M communication may also be called as Machine Type Communication (MTC). That is, the M2M communication refers to the concept of communication based on the existing wireless communication network used by a machine device that is not directly operated by a human. The machine device used in the M2M communication can be called a M2M device. There are various M2M devices such as a vending machine, a machine of measuring a water level at a dam, etc.

The M2M device has a feature different from that of a typical human-operated device. Therefore, a service optimized to the M2M communication may differ from a service optimized to human-to-human communication. In comparison with a conventional mobile network communication service, the M2M communication can be characterized as a different market scenario, data communication, less costs and efforts, a potentially great number of M2M devices, wide service areas, low traffic for each M2M device, etc.

An idle mode is a mode in which a wireless device wakes up only during a specific duration to transmit or receive data in order to save battery consumption. A network re-entry process is a process in which the wireless device in the idle mode is recovered to a connected state with respect to a network.

It is required to consider the M2M communication feature in the operation of the M2M device in the idle mode.

SUMMARY OF THE INVENTION

The present invention provides a method and device for operating in an idle mode for Machine To Machine (M2M) communication.

In an aspect, a method for operating in an idle mode for Machine To Machine (M2M) communication is provided. The method includes entering, by a M2M device, into an idle mode, receiving, by the M2M device in the idle mode, a paging message from a base station, the paging message including a network access type and a resource offset, the network access type indicating a resource allocation for a ranging request, the resource offset indicating an offset that the M2M device starts to monitor assignment information, the assignment information including the resource allocation for the ranging request, and monitoring, by the M2M device, the assignment information beginning from the offset. Cyclic redundancy check (CRC) bits of the assignment information are masked with a first part of a M2M identifier, the assignment information includes an identifier type and a second part of the M2M identifier, and the identifier type indicates that the M2M identifier is a fixed M2M deregistration identifier (FMDID) or a deregistration identifier (DID), the FMDID being a 16-bit identifier that uniquely identifies the M2M device in domain of the base station, the DID being a 18-bit identifier that uniquely identifies the M2M device in domain of a paging group.

In another aspect, a wireless device configured for operating in an idle mode for Machine To Machine (M2M) communication includes a radio frequency unit for receiving and transmitting a radio signal, and a processor operatively coupled with the radio frequency unit. The processor is configured to enter into an idle mode, receive, at the idle mode, a paging message from a base station, the paging message including a network access type and a resource offset, the network access type indicating a resource allocation for a ranging request, the resource offset indicating an offset that the M2M device starts to monitor assignment information, the assignment information including the resource allocation for the ranging request, and monitor the assignment information beginning from the offset.

DESCRIPTION OF EXEMPLARY EMBODIMENTS

Figure 1:
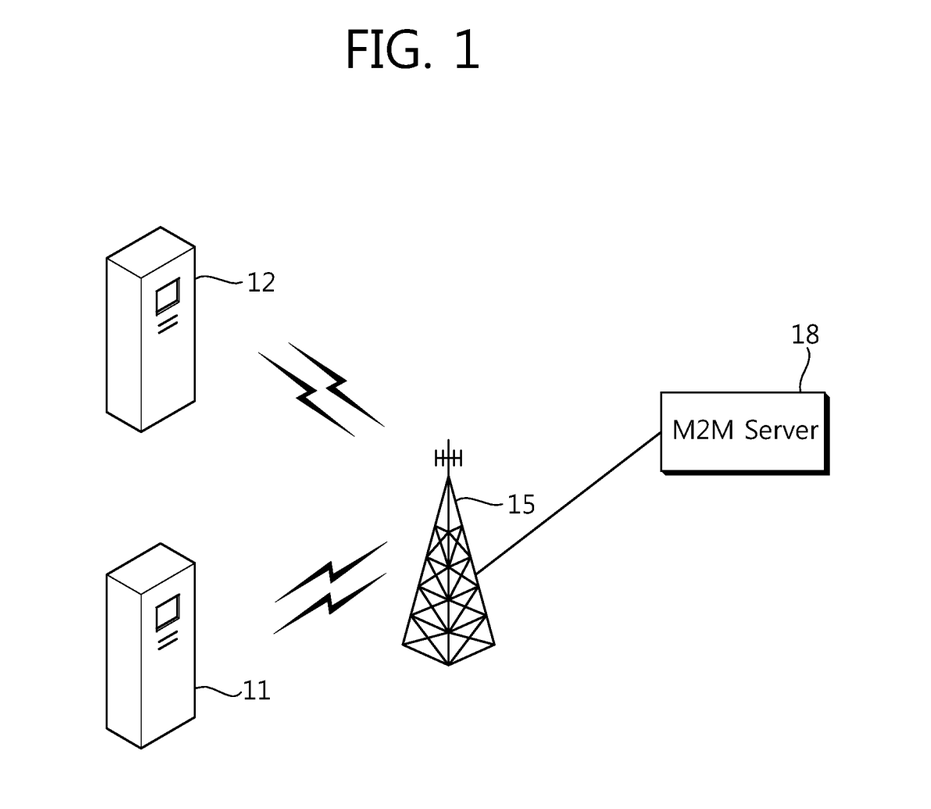
FIG. 1 shows an example of M2M (Machine To Machine) communication.

FIG. 1 shows an example of M2M (Machine To Machine) communication.

The M2M communication is also called a Machine Type Communication (MTC), and refers to information exchange between M2M devices 11 and 12 via a Base Station (BS) 15 without human interactions and information exchange between the M2M device 11 and a M2M server 18 via the BS.

The M2M server 18 is an entity for communicating with the M2M device 11. The M2M server executes a M2M application, and provides a M2M-specific service to the M2M device 11.

The M2M device 11 is a wireless device for providing the M2M communication, and may be fixed or mobile. The M2M device may also be called as a MTC device.

A service provided using the M2M communication may be differentiated from the conventional communication service requiring human intervention, and its service range is various, such as tracking, metering, payment, medical field services, remote controlling, etc.

Representative examples of individual service requirements of M2M features may be as follows.

1) Time controlled feature: This is a case in which the M2M device transmits or receives data only in a pre-defined specific duration. Therefore, unnecessary signaling performed outside the pre-defined specific duration can be avoided.

2) Time tolerant feature: This is a case in which the M2M device can delay data delivery. If a network load is greater than a pre-determined load threshold, a network operator can restrict network access of the M2M device or data transmission to another MTC device, and can dynamically restrict an amount of data that can be delivered by the MTC device in a specific region.

3) Offline indication feature: This is a case in which a notification is requested to the M2M device at a proper time when signaling is no longer possible between the M2M device and the network.

4) PAM (Priority Alarm Message) feature: This is a case in which, at the occurrence of a theft, a vandalism, or an emergency situation requiring an immediate attention, the M2M device preferentially reports this to the network.

It is considered that hundreds to thousands of M2M devices are deployed in one cell (or BS). Accordingly, it is difficult to identify the M2M devices by using only the existing user equipment identifiers, and thus the following identifier is taken into account.

Station identifier (STID): The STID is used to identify the M2M devices in the domain of the BS. The BS may assign the same STID to multiple M2M devices.

M2M Group Identifier (MGID): The MGID is a 12-bit value that uniquely identifies a downlink multicast service flow shared by a group of M2M devices within an M2M Group Zone. The M2M Group Zone is a logical zone comprising one or more BSs. An M2M Group Zone is identified by a M2M GROUP ZONE ID. The MGID may be assigned during dynamic service addition (DSA) procedure. The assigned MGID may be retained by the M2M device even in idle state unless the M2M device exits from the network or the network explicitly deletes the service flow associated with the MGID.

Now, the idle mode operation in an IEEE 802.16m-based system will be described with reference to IEEE (Institute of Electrical and Electronics Engineers) P802.16m/D10 "Part 16: Air Interface for Broadband Wireless Access Systems: Advanced Air Interface" released at Nov. 24, 2010. However, a wireless communication system to which the present invention is applied is not limited to the IEEE 802.16m-based system. Thus, the present invention may also be applicable to various wireless communication systems such as 3GPP (3rd Generation Partnership Project) LTE (Long Term Evolution), etc.

Figure 2:
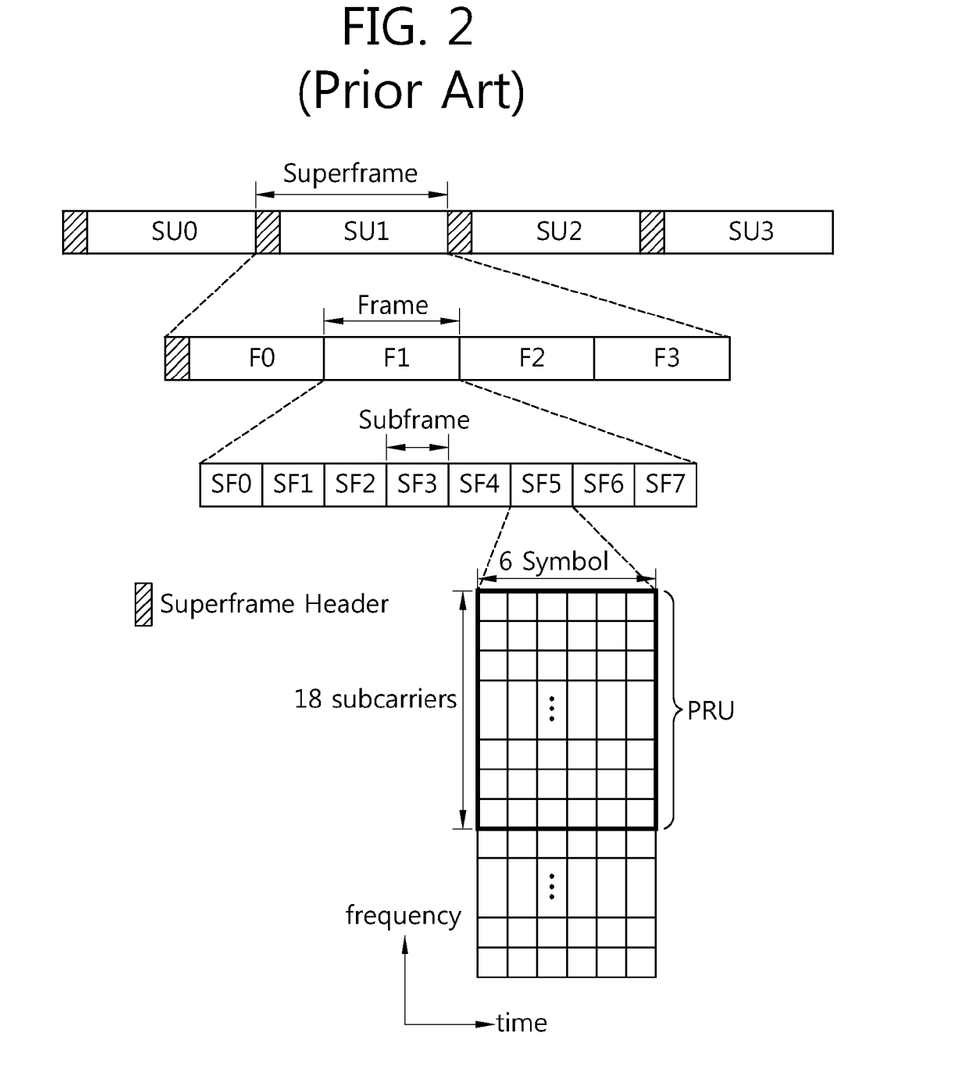
FIG. 2 shows an exemplary frame structure of an IEEE 802.16m system.

FIG. 2 shows an exemplary frame structure of an IEEE 802.16m system.

A Superframe (SF) includes a Superframe Header (SFH) and four frames F0, F1, F2, and F3. Each frame may have the same length in the SF. A size of the SF is 20 ms, and a size of each frame is 5 ms.

The frame includes a plurality of subframes SF0, SF1, SF2, SF3, SF4, SF5, SF6, and SF7. The subframe can be used for uplink transmission or downlink transmission. The subframe includes a plurality of Orthogonal Frequency Division Multiplexing (OFDM) symbols in a time domain. The OFDM symbol is for expressing one symbol period, and there is no limitation in a multiple access scheme or terminologies.

The subframe includes 6 OFDM symbols. This is for exemplary purposes only. The subframe may include 5, 7, or 9 OFDM symbols, and the present invention is not limited thereto.

A subframe type can be defined according to the number of OFDM symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols.

A Time Division Duplex (TDD) scheme or a Frequency Division Duplex (FDD) scheme can be applied to the frame. Subframes included in a TDD frame can be divided into uplink subframes and downlink subframes.

The size of the SF, the number of frames included in the SF, the number of subframes included in the frame, and the number of OFDM symbols included in the subframe may change, and the present invention is not limited thereto.

The SFH can carry an essential system parameter and system configuration information. The SFH can be transmitted in the last 5 OFDM symbols of the first subframe included in the SF.

A Physical Resource Unit (PRU) is a basic resource assignment unit, and includes 18 subcarriers in consecutive OFDM symbols in the same subframe.

In IEEE 802.16 system, an Advanced-MAP (A-MAP) carries service control information. A non-user specific A-MAP carries information which is not limited to a specific user or a specific user group. A Hybrid Automatic Repeat Request (HARQ) Feedback A-MAP carries HARQ ACK/NACK information regarding uplink data transmission. A Power Control A-MAP carries a power control command for a mobile station (MS).

An Assignment A-MAP carries resource assignment information. The Assignment A-MAP includes several types of A-MAPs, such as a Downlink (DL) Basic Assignment A-MAP, a Uplink (UL) Basic Assignment A-MAP, a Code Division Multiple Access (CDMA) Allocation A-MAP, etc.

The CDMA Allocation A-MAP includes a UL resource assignment based on a band request or a UL resource assignment based on a ranging request.

All A-MAPs share a physical resource region called an A-MAP region. The A-MAP region exists in each DL subframe.

Figure 3:
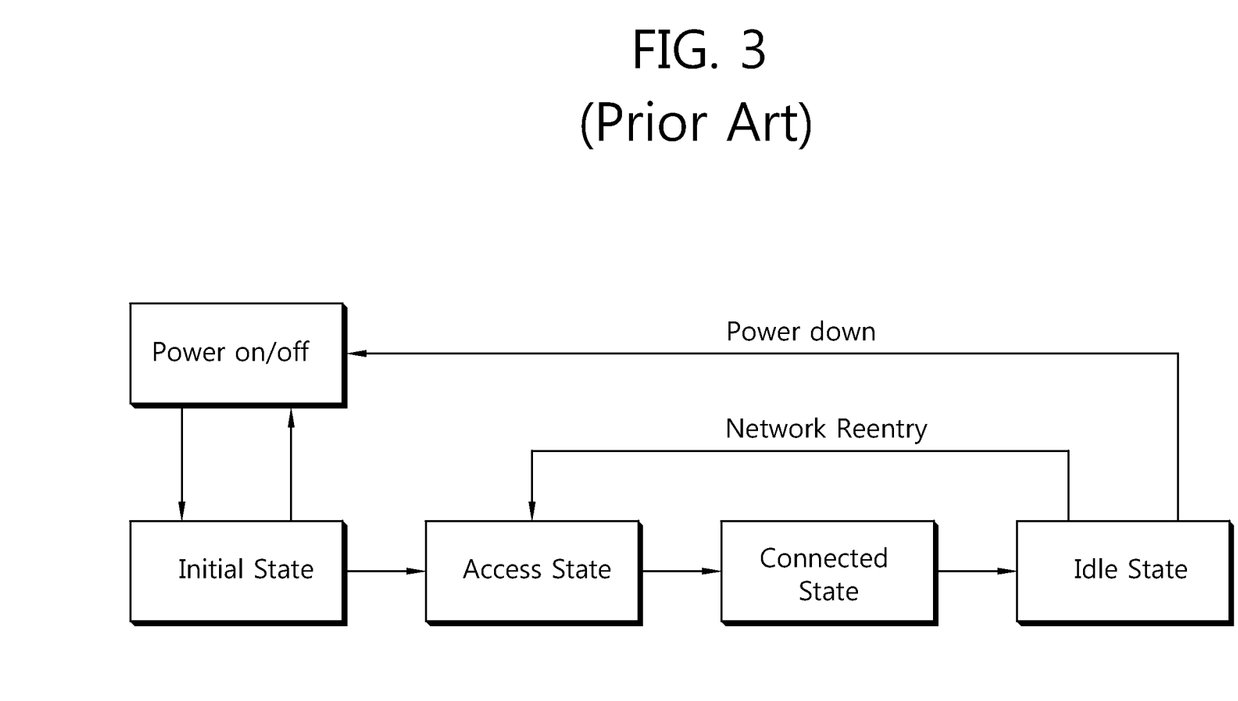
FIG. 3 shows an operation transition diagram in IEEE 802.16m.

FIG. 3 shows an operation transition diagram in IEEE 802.16m.

In an initialization state, a mobile station (MS) may perform cell selection by receiving synchronization and system configuration.

In an access state, the MS may perform a network entry. The network entry is a process including ranging, basic capability negotiation, and authentication with respect to a BS.

In a connected state, the MS may operate in any one of a sleep mode, an active mode, and a scanning mode. During the connected state, the MS maintains a connection established during the connected state. The MS in the active mode can always transmit or receive scheduled data. In the sleep mode, a radio frame is divided into a sleep window and a listening window. The MS in the sleep mode can receive data from the BS during the listening window. The MS in the scanning mode performs measurement instructed by the BS.

In the idle state, the MS may operate in the idle mode. The idle mode includes a paging listening interval and a paging unavailable interval. The BS may not transmit any DL traffic (e.g., a paging message, etc.) to the MS during paging unavailable interval. During paging unavailable interval, the MS may power down, scan neighbor ABSs, select a preferred BS, conduct ranging, or perform other activities for which the AMS will not guarantee availability to any BS for DL traffic.

The MS may derive the start of the paging listening interval based on a paging cycle and a paging offset. One paging cycle includes the paging listening interval and the paging unavailable interval. The paging offset may be used to determine a superframe within the paging cycle from which the paging listening interval starts.

Figure 4:
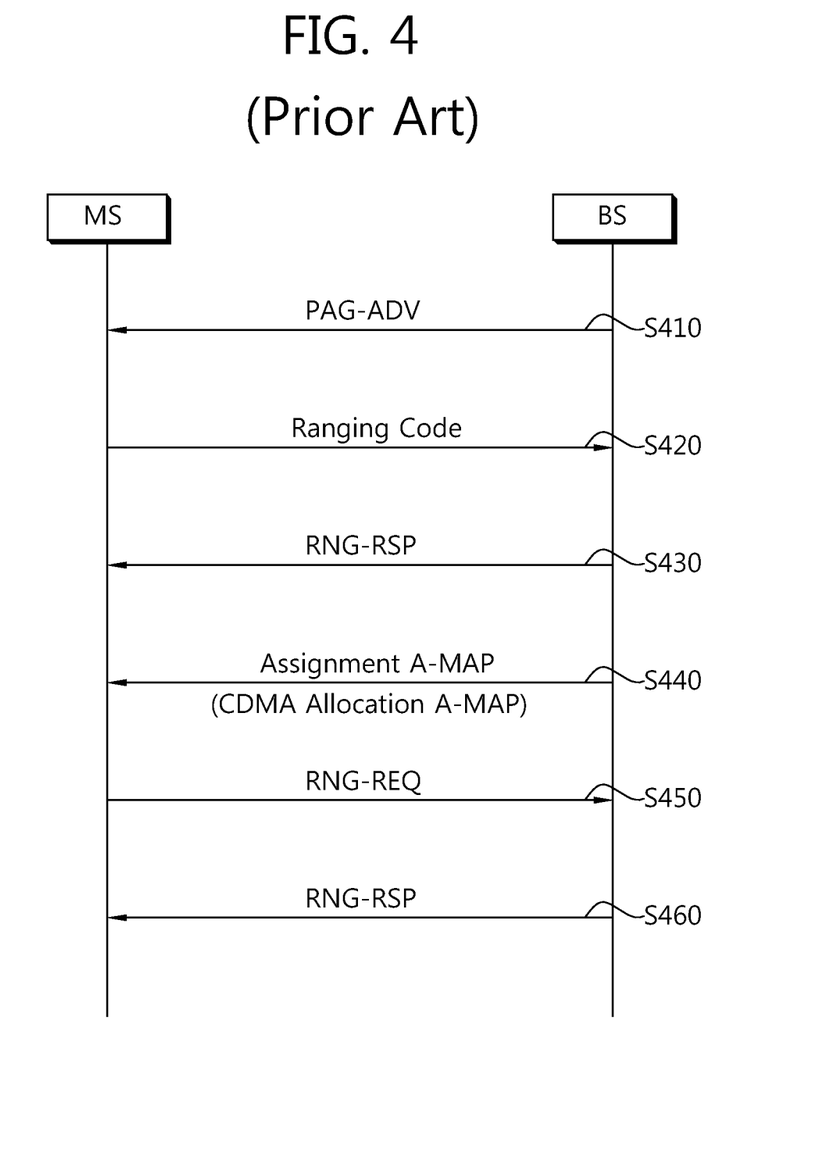
FIG. 4 is a flowchart showing an operation in an idle mode in IEEE 802.16m.

FIG. 4 is a flowchart showing an operation in an idle mode in IEEE 802.16m.

In step S410, in the idle mode, an MS monitors reception of a paging message during a paging available interval, and thus receives a Paging Advertisement (PAG-ADV) message. The PAG-ADV message is a paging massage at IEEE 802.16 and is a notification message for indicating whether there is pending DL traffic to a specific MS. The PAG-ADV message may be one example of a paging message for attempting paging to a M2M device in the idle mode.

By using the PAG-ADV message, a BS can instruct each MS to perform ranging for a network reentry or a location update.

In step S420, when the PAG-ADV message requests the network reentry, the MS ends the idle mode, and transmits a ranging code to the BS.

In step S430, in response to the ranging code, the MS receives a RNG-RSP (Ranging-Response) message from the BS. The RNG-RSP message includes a status code. The status code indicates one of 'continue', 'success', and 'abort'.

If the received RNG-RSP message has the status code of 'continue', the MS retransmits the ranging code.

If the status code is 'success', in step S440, the MS receives an Assignment A-MAP (Advanced-MAP). The Assignment A-MAP includes a CDMA Allocation A-MAP.

The A-MAP is one example of control information for communication between the BS and the MS in the IEEE 802.16-based system. The A-MAP can be called variously, for example, control information, control channels, resource assignment information, etc., according to a wireless communication system.

In step S450, by using a UL resource assignment indicated by the CDMA Allocation A-MAP, the MS transmits a RNG-REQ (Ranging-Request) message to the BS.

In step S460, the MS receives a RNG-RSP message in response to the RNG-REQ message.

In the idle mode, the MS first transmits the ranging code for the network re-entry. The ranging code is randomly selected by the MS from a plurality of code sets, and this is called contention based ranging.

Since the MS is mobile in the conventional mobile communication system, there is no guarantee that UL synchronization is contiguously maintained between the BS and the MS in the idle mode. Therefore, when the MS receives paging in the idle mode, the MS performs UL synchronization by first performing ranging for the network re-entry.

However, in M2M communication, a M2M device is mostly fixed. Alternatively, the M2M device having the time controlled feature does not require additional UL synchronization since UL synchronization is continuously maintained.

Therefore, dedicated resource allocation for M2M device in the idle mode has been proposed. This means when the M2M device is paged, a dedicated resource for a ranging request is assigned. The M2M device transmits the raging request by using the dedicated resource. This is called as non-contention based ranging.

However, the currently discussed non-contention based ranging do not consider various types of identifiers (IDs) that can be used in the idle mode.

There are two types of IDs that can be assigned to the M2M device in the idle mode (1) Fixed M2M Deregistration ID (FMDID): The FMDID is a 16-bit value that uniquely identifies a M2M device in domain of a BS. The FMDID is assigned to the M2M device by the BS during idle mode entry and released during the network reentry.

(2) Deregistration identifier (DID): The DID is a 18-bit value used to identify a device in an idle mode within a set of paging group ID, paging cycle and paging offset. The network may assign the DID to each device during idle mode initiation.

It can be said that FMDID is used to identify the M2M device in domain of BS and DID is used to identify the M2M device in domain of paging group or paging controller.

The present invention proposes how the M2M device in the idle mode monitors the resource allocation for non-contention based ranging when at least one of FMDID and DID is assigned to the M2M device.

Figure 5:
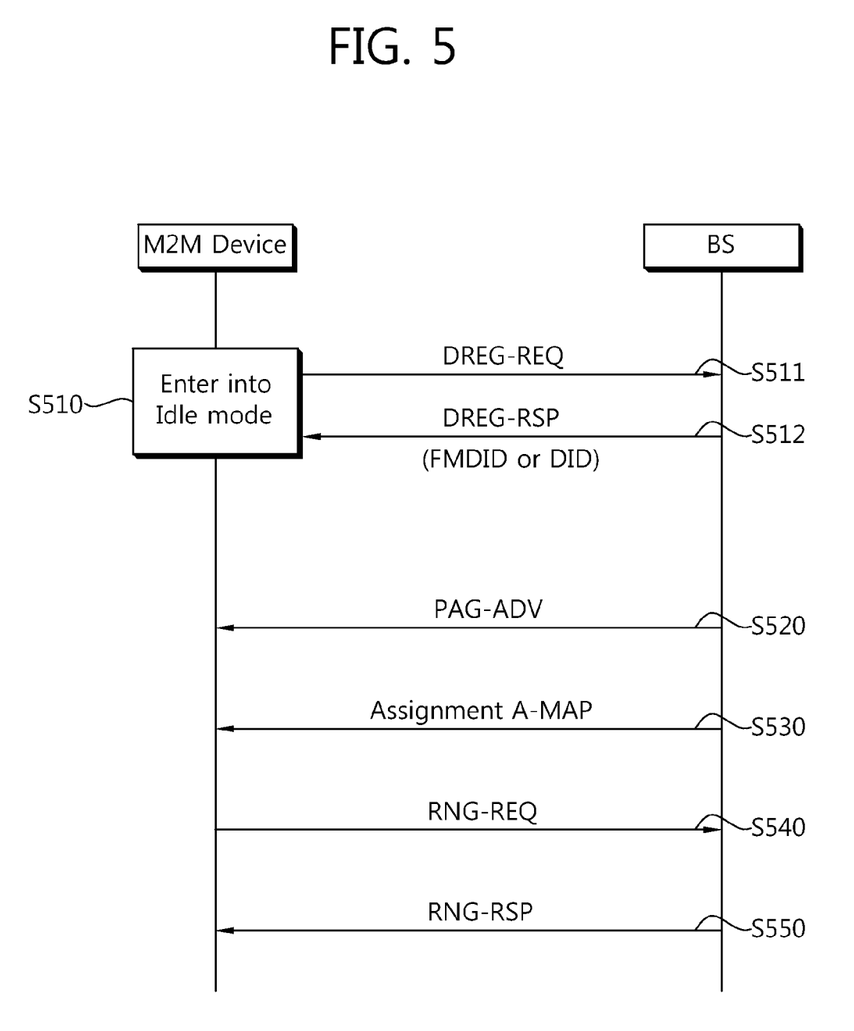
FIG. 5 shows an operation in an idle mode according to an embodiment of the present invention.

FIG. 5 shows an operation in an idle mode according to an embodiment of the present invention.

In step S510, a M2M device enters into the idle mode. The entering into the idle mode can be performed at a request of the M2M device or at a command from a BS.

For example, in order for the M2M device to enter into the idle mode, in step S511, the M2M device may send to the BS a DREG-REG (Deregistration-Request) message for requesting the entering into the idle mode. In step S512, the M2M device may receive from the BS a DREG-RSP (Deregistration-Response) message for instructing the start of the idle mode.

Alternatively, the BS may transmit a DREG-CMD (Deregistration-Command) message to allow the M2M device to enter into the idle mode.

To eliminate the need for allocating the unnecessary paging information (i.e., Paging Group ID, Paging Controller ID), a M2M device may enter a localized idle mode. The localized idle mode for the M2M device is initiated either by the M2M device or by its BS.

In case of M2M device-initiated localized idle mode entry, the M2M device may include a Localized Mode flag set to 1 in the DREG-REQ message. When the BS receives the DREG-REQ with the Localized Mode flag set to 1 and accepts M2M device's request, it does not inform the Paging Controller that the M2M device enters idle mode. Then the BS sends the DREG-RSP with the Localized Mode flag set to 1 or 0. The Localized Mode flag set to 1 indicates that the BS accepted M2M device's request. Then the M2M device transitions to localized idle mode and does not perform the paging operation and location update operation based on the paging group. If the Localized Mode flag included in the DREG-RSP is set to 0, the M2M device enters the normal idle mode.

Using ABS-initiated localized idle mode entry, the BS may signal for the M2M device to begin localized idle mode by sending a DREG-RSP message in unsolicited manner. This unsolicited DREG-RSP may include a Localized Mode flag set to 1. When the M2M device receives the unsolicited DREG-RSP with the Localized Mode flag set to 1, the M2M device shall immediately start the idle mode initiation procedures by sending DREG-REQ message with the Localized Mode flag set to 1 or 0 in response to the unsolicited AAI-DREG-RSP message.

Table 1 shows an exemplary format of the DREG-REQ message.

TABLE 1

| Field | Size (bits) | Description |
| --- | --- | --- |
| DREQ Request Code | 3 | Used to indicate the purpose of this message<br>0x01: request for deregistration from BS and initiation of idle mode.<br>0x02: response for the unsolicited DREG-RSP message |
| Localized Mode flag | 1 | 0: M2M device enters the normal idle mode.<br>1: M2M device enters the localized idle mode. |

Table 2 shows an exemplary format of the DREG-RSP message.

TABLE 2

| Field | Size (bits) | Description |
| --- | --- | --- |
| Action Code | 12 | 0x05: The M2M device begins idle mode initiation |
| Localized Mode flag | 1 | 0: M2M device enters the normal idle mode.<br>1: M2M device enters the localized idle mode. |
| Paging cycle | 4 | Used to indicate Paging cycle |
| Paging offset | 12 | Used to indicate Paging offset |
| Paging controller ID | 48 | Used to indicate Paging controller that manages and retains the M2M device's idle mode information.<br>presented only when the Localized Mode flag == 0b0. |
| Paging group ID | 16 | Used to indicate Paging group that M2M device is located in. presented only when the Localized Mode flag == 0b0. |
| DID | 18 | Used to indicate Deregistration ID used to identify M2M device in idle mode.<br>presented only when the Localized Mode flag == 0b0. |
| FMDID | 16 | presented only when the Localized Mode flag == 0b1. |

FMDID is used to identify the M2M device in localize idle mode. DID is used to identify the M2M device in normal idle mode.

In step S520, in the idle mode, the M2M device monitors reception of a paging message during a paging listening interval and thus receives a PAG-ADV message.

The PAG-ADV message may indicate non-contention based ranging in which the PAG-ADV message includes where the M2M device monitors assignment information (i.e. Assignment A-MAP) which includes uplink resource allocation for RNG-REQ.

The PAG-ADV message may be a group paging message and/or an individual paging message. The group paging message include a MGID and the individual paging message includes DID and/or FMDID.

Table 3 below shows an exemplary format of the group paging message.

TABLE 3

| Field | Size (bits) | Description |
| --- | --- | --- |
| MGID | 12 | M2M Group ID |
| M2M Group Zone Index | 2 | A zone Index corresponding to an M2M GROUP ZONE ID. Present if a BS is part of more than one M2M Group Zone. |
| Action Code | 2 | 0b00: Performing network reentry<br>0b01: Performing location update |
| network access type | 2 | Indicate the network access scheme for M2M device<br>0b00: Resource allocation for RNG-REQ. |
| Resource offset | | This parameter may indicate the offset in units of frames that M2M device starts to monitor assignment information (i.e., Assignment A-MAP) for the ranging request, where the reference point of this offset value may be the frame in which the PAG-ADV is transmitted. |
| Monitoring duration | | This parameter may indicate time duration that M2M device monitors the assignment information for ranging request. |

Table 4 below shows an exemplary format of the individual paging message including DID.

TABLE 4

| Field | Size (bits) | Description |
| --- | --- | --- |
| DID | 18 | DID |
| Paging cycle | 4 | Used to indicate Paging cycle |
| Action Code | 1 | 0b0: Performing network reentry<br>0b1: Performing location update |
| Network access type | 2 | Indicate the network access scheme for M2M device<br>0b00: Resource allocation for RNG-REQ. |
| Resource offset | | This parameter may indicate the offset in units of frames that M2M device starts to monitor assignment information (i.e., Assignment A-MAP) for the ranging request, where the reference point of this offset value may be the frame in which the PAG-ADV is transmitted. |

Table 5 below shows an exemplary format of the individual paging message including FMDID.

TABLE 5

| Field | Size (bits) | Description |
| --- | --- | --- |
| FMDID | 16 | FMDID |
| Action Code | 1 | 0b0: Performing network reentry<br>0b1: Performing location update |
| Network access type | 2 | Indicate the network access scheme for M2M device<br>0b00: Resource allocation for RNG-REQ. |
| Resource offset | | This parameter may indicate the offset in units of frames that M2M device starts to monitor assignment information (i.e., Assignment A-MAP) for the ranging request, where the reference point of this offset value may be the frame in which the PAG-ADV is transmitted. |

When the M2M device receives the PAG-ADV message with at least one of MGID, FMDID and DID and its network access type is set to 0b00 or 0b1 (i.e., Resource allocation for RNG-REQ), it starts to monitor an Assignment A-MAP to obtain the uplink resource allocation for RNG-REQ at a resource offset. If the M2M device is group-paged and the M2M device fails to decode the Assignment A-MAP until the expiration of the monitoring duration, the M2M device may perform contention-based ranging.

In step S530, the M2M device receives the Assignment A-MAP by performing monitoring beginning from a resource offset. "Reception of the Assignment A-MAP" may imply successful decoding of the Assignment A-MAP.

The Assignment A-MAP is used to allocate uplink resource allocation for the M2M device. The Assignment A-MAP may have a 16-bit CRC (Cyclic Redundancy Check) bits masked with a masking sequence. The 16-bits masking sequence may include a masking prefix=0b0, a message type indicator=0b011, and a masking code=a part of a M2M ID. The part of the M2M ID may include LSB (least significant bit) 12 bits of FMDID or LSB 12 bits of DID. The Assignment A-MAP may include a remaining part of the M2M ID (i.e. MSB (most significant bit) 4 bit of FMDID or MSB 6 bits of DID).

Table 6 shows an exemplary format of the Assignment A-MAP according to an embodiment of the present invention.

TABLE 6

| Field | Size (bits) | Description |
|---|---|---|
| Part of M2M ID | | a remaining part of M2M ID (i.e. MSB 4 bits of FMDID or MSB 6 bits of DID) which is not used for the masking code. |
| Uplink/Downlink Indicator | 1 | Indicates whether the following fields are for resource assignment in the uplink or in the downlink. 0b0: Uplink 0b1: Downlink |
| Resource Assignment | | |

As the masking code, LSB 12 bits of FMDID or LSB 12 bits of DID is used. In some case, even though FMDID and DID is different from each other, LSB 12 bits of FMDID is same as LSB 12 bits of DID. This means that an unwanted M2M device can succeed to decode the Assignment A-MAP and the M2M device does not know which of FMDID and DID is included in the Assignment A-MAP. To prevent this confusion, ID type is proposed.

Table 7 shows an exemplary format of the Assignment A-MAP according to another embodiment of the present invention.

TABLE 7

| Field | Size (bits) | Description |
|---|---|---|
| ID type | 1 | 0: DID 1: FMDID |
| If (ID type==0) { | | |
| Part of DID | 6 | MSB 6 bits of DID |
| Paging Cycle | 4 | |
| } | | |
| If (ID type==1) { | | |
| Part of FMDID | 4 | MSB 4 bits of FMDID |
| } | | |
| Uplink/Downlink Indicator | 1 | Indicates whether the following fields are for resource assignment in the uplink or in the downlink. 0b0: Uplink 0b1: Downlink |
| Resource Assignment | | |

In step S540, the M2M device transmits the RNG-REQ message to the BS by using the UL resource allocation included in the Assignment A-MAP.

In step S550, the M2M device receives a RNG-RSP message in response to the RNG-REQ message.

Figure 6:
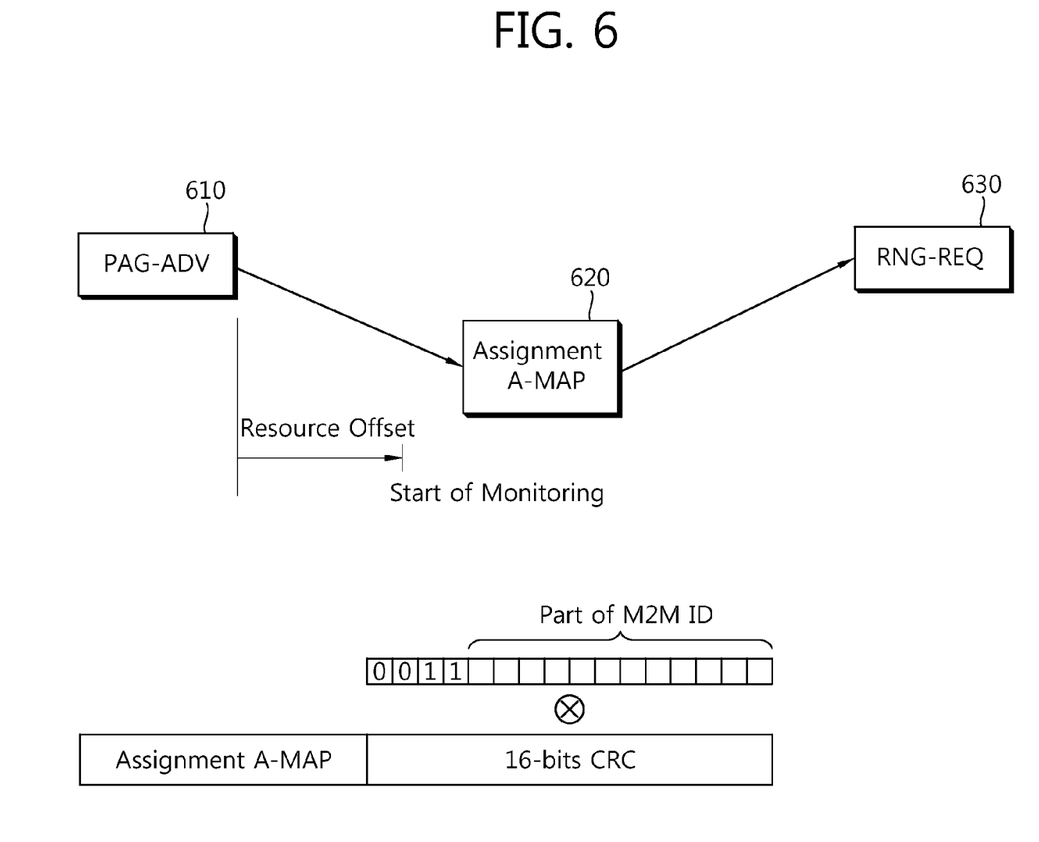
FIG. 6 shows an example of monitoring assignment information according to an embodiment shown in FIG. 5.

FIG. 6 shows an example of monitoring assignment information according to an embodiment shown in FIG. 5.

A M2M device receives a PAG-ADV message 610 indicating a resource allocation for RNG-REQ. The PAG-ADV message 610 may be a group paging message or an individual paging message. The PAG-ADV message 610 may include a resource offset to monitor an Assignment A-MAP 620.

The M2M device monitors the Assignment A-MAP 620 on the basis of the resource offset. For example, if the M2M device has FMDID, the M2M device may try to decode the Assignment A-MAP by using LSB 12 bits of the FMDID. If the M2M device has DID, the M2M device try to decode the Assignment A-MAP by using LSB 12 bits of the DID.

If the M2M device successfully decodes the Assignment A-MAP 620, the M2M device transmits a RNG-REQ message 630 by using the UL resource allocation in the Assignment A-MAP 620.

In the above tables, a field name, a size, and a field value are for exemplary purposes only, and thus can be easily modified to other names and other values by those ordinarily skilled in the art. Not all of the fields proposed in the table are essential, and thus a specific field can be omitted or added.

Figure 7:
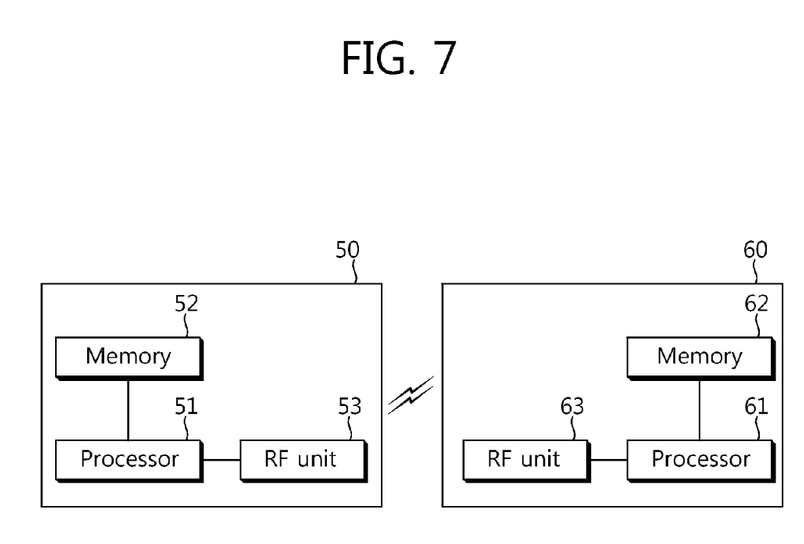
FIG. 7 is a block diagram showing a wireless communication system to implement an embodiment of the present invention.

FIG. 7 is a block diagram showing a wireless communication system to implement an embodiment of the present invention.

A wireless device 50 includes a processor 51, memory 52, and a radio frequency (RF) unit 53. The memory 52 is connected to the processor 51 and configured to store various information used for the operations for the processor 51. The RF unit 53 is connected to the processor 51 and configured to send and/or receive a radio signal. The processor 51 implements the proposed functions, processed, and/or methods. In the described embodiments, the operation of the M2M device may be implemented by the processor 51.

A BS 60 includes a processor 61, memory 62, and an RF unit 63. The memory 62 is connected to the processor 61 and configured to store various information used for the operations for the processor 61. The RF unit 63 is connected to the processor 61 and configured to send and/or receive a radio signal. The processor 61 implements the proposed functions, processed, and/or methods. In the described embodiments, the operation of the BS may be implemented by the processor 51.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for operating in an idle mode for Machine To Machine (M2M) communication, comprising:
   entering, by a M2M device, into an idle mode;
   receiving, by the M2M device in the idle mode, a paging message from a base station, the paging message including a network access type and a resource offset, the network access type indicating a resource allocation for a ranging request, the resource offset indicating an offset that the M2M device starts to monitor assignment information; and
   monitoring, by the M2M device, the assignment information beginning from the offset,
      wherein cyclic redundancy check (CRC) bits of the assignment information are masked with a first part of a M2M identifier,
   wherein the assignment information includes an identifier type and a second part of the M2M identifier,
   wherein the identifier type indicates that the M2M identifier is a fixed M2M deregistration identifier (FMDID) or a deregistration identifier (DID), the FMDID being a 16-bit identifier that uniquely identifies the M2M device in domain of the base station, the DID being an 18-bit identifier that uniquely identifies the M2M device in domain of a paging group, and
   wherein when the identifier type indicates that the M2M identifier is the FMDID, the first part of the M2M identifier includes least significant bit (LSB) 12 bits of the FMDID and the second part of the M2M identifier includes most significant bit (MSB) 4 bits of the FMDID.

2. The method of claim 1, wherein the FMDID is assigned to the M2M device by the base station during an idle mode entry and is released during a network reentry.

3. The method of claim 1, wherein when the identifier type indicates that the M2M identifier is the DID, the first part of the M2M identifier includes LSB 12 bits of the DID and the second part of the M2M identifier includes MSB 6 bits of the DID.

4. The method of claim 1, wherein the identifier type has a size of 1 bit.

5. The method of claim 1, further comprising:
   receiving, by the M2M device, the assignment information when the assignment information is successfully decoded; and
   transmitting, by the M2M device, the ranging request to the base station by using a resource allocation in the assignment information.

6. The method of claim 1, wherein the paging message further includes a M2M group identifier that identifies a M2M group to which the M2M device belongs.

7. The method of claim 6, wherein the paging message further includes a monitoring duration indicating a time duration that the M2M device monitors the assignment information.

8. A wireless device configured for operating in an idle mode for Machine To Machine (M2M) communication, comprising:
   a radio frequency unit for receiving and transmitting a radio signal; and
   a processor operatively coupled with the radio frequency unit and configured to:
      enter into an idle mode;
      receive, at the idle mode, a paging message from a base station, the paging message including a network access type and a resource offset, the network access type indicating a resource allocation for a ranging request, the resource offset indicating an offset that the M2M device starts to monitor assignment information; and
      monitor the assignment information beginning from the offset,
   wherein cyclic redundancy check (CRC) bits of the assignment information are masked with a first part of a M2M identifier,
   wherein the assignment information includes an identifier type and a second part of the M2M identifier,
   wherein the identifier type indicates that the M2M identifier is a fixed M2M deregistration identifier (FMDID) or a deregistration identifier (DID), the FMDID being a 16-bit identifier that uniquely identifies the wireless device in domain of the base station, the DID being an 18-bit identifier that uniquely identifies the wireless device in domain of a paging group, and
   wherein when the identifier type indicates that the M2M identifier is the FMDID, the first part of the M2M identifier includes least significant bit (LSB) 12 bits of the FMDID and the second part of the M2M identifier includes most significant bit (MSB) 4 bits of the FMDID.

9. The wireless device of claim 8, wherein the FMDID is assigned to the wireless device by the base station during an idle mode entry and is released during a network reentry.

10. The wireless device of claim 8, wherein when the identifier type indicates that the M2M identifier is the DID, the first part of the M2M identifier includes LSB 12 bits of the DID and the second part of the M2M identifier includes MSB 6 bits of the DID.

11. The wireless device of claim 8, wherein the identifier type has a size of 1 bit.

12. The wireless device of claim 8, wherein the processor is configured to:
   receive the assignment information when the assignment information is successfully decoded; and
   transmit the ranging request to the base station by using a resource allocation in the assignment information.

13. The wireless device of claim 8, wherein the paging message further includes a M2M group identifier that identifies a M2M group to which the M2M device belongs.

* * * * *